(12) United States Patent
Haynes

(10) Patent No.: US 10,197,194 B2
(45) Date of Patent: Feb. 5, 2019

(54) INFLATABLE CAVITY FILL OR CAVITY FORMING MEMBER

(71) Applicants: LAKE PRODUCTS LIMITED, Rosedale, Auckland (NZ); Andrew Leo Haynes, Auckland (NZ)

(72) Inventor: Andrew Leo Haynes, Auckland (NZ)

(73) Assignee: Lake Products Limited, Auckland (NZ)

( * ) Notice: Subject to any disclaimer, the term of this patent is extended or adjusted under 35 U.S.C. 154(b) by 9 days.

(21) Appl. No.: 14/781,775

(22) PCT Filed: Apr. 7, 2014

(86) PCT No.: PCT/NZ2014/000058
§ 371 (c)(1),
(2) Date: Oct. 1, 2015

(87) PCT Pub. No.: WO2014/163511
PCT Pub. Date: Oct. 9, 2014

(65) Prior Publication Data
US 2016/0053921 A1  Feb. 25, 2016

(30) Foreign Application Priority Data
Apr. 5, 2013 (NZ) ....................... 609098

(51) Int. Cl.
*F16J 15/46* (2006.01)
*F16L 5/10* (2006.01)
(Continued)

(52) U.S. Cl.
CPC ............ *F16L 5/10* (2013.01); *B28B 7/303* (2013.01); *B28B 7/32* (2013.01); *E04G 15/061* (2013.01);
(Continued)

(58) Field of Classification Search
CPC ...... E04F 17/08; E04G 15/061; E04G 15/066; F16L 55/035; H02G 3/22; B28B 7/32; B28B 7/303; E04B 5/48
(Continued)

(56) References Cited

U.S. PATENT DOCUMENTS 3,388,509 A * 6/1968 Mora ..................... B28B 7/32
264/314
3,831,898 A   8/1974 Sachs
(Continued)

FOREIGN PATENT DOCUMENTS

DE          3941921 A1    6/1991
GB          1371568 A    10/1974
WO   WO 2005/082446 A1    9/2005

OTHER PUBLICATIONS

Examination report of corresponding Australian Application No. 2014250137 dated Dec. 21, 2016, 3 pps.

*Primary Examiner* — Charles A Fox
*Assistant Examiner* — James Buckle, Jr.
(74) *Attorney, Agent, or Firm* — Foley & Lardner LLP

(57) ABSTRACT

A device for filling or creating a void within a construction medium. The device has a body having at least one inflatable body portion. Each inflatable body portion has one or more inflatable cavities. There is at least one valve member fluidly connected to the one or more inflatable cavity to control flow of fluid into and inflate said cavity. In-use, the one or more cavities are shaped to substantially fill or create the void in a construction medium when in an inflated state.

25 Claims, 12 Drawing Sheets

(51) Int. Cl.
    *B28B 7/32*         (2006.01)
    *F16L 5/02*         (2006.01)
    *F16L 55/035*      (2006.01)
    *H02G 3/22*        (2006.01)
    *B28B 7/30*        (2006.01)
    *E04G 15/06*      (2006.01)
    *E04B 5/48*        (2006.01)
    *E04F 17/08*      (2006.01)

(52) U.S. Cl.
    CPC ............ *E04G 15/066* (2013.01); *F16L 5/025* (2013.01); *F16L 55/035* (2013.01); *H02G 3/22* (2013.01); *E04B 5/48* (2013.01); *E04F 17/08* (2013.01)

(58) Field of Classification Search
    USPC .......................................................... 52/2.11
    See application file for complete search history.

(56) References Cited

U.S. PATENT DOCUMENTS

| | | | | |
|---|---|---|---|---|
| 4,058,987 A | * | 11/1977 | Gerbault | F16L 5/10 |
| | | | | 405/169 |
| 4,746,471 A | * | 5/1988 | Hale | E04G 11/04 |
| | | | | 264/32 |
| 4,790,544 A | | 12/1988 | Kemp | |
| 5,560,618 A | * | 10/1996 | Wambeke | F16L 5/02 |
| | | | | 156/291 |
| 5,979,909 A | | 11/1999 | Wambeke | |

\* cited by examiner

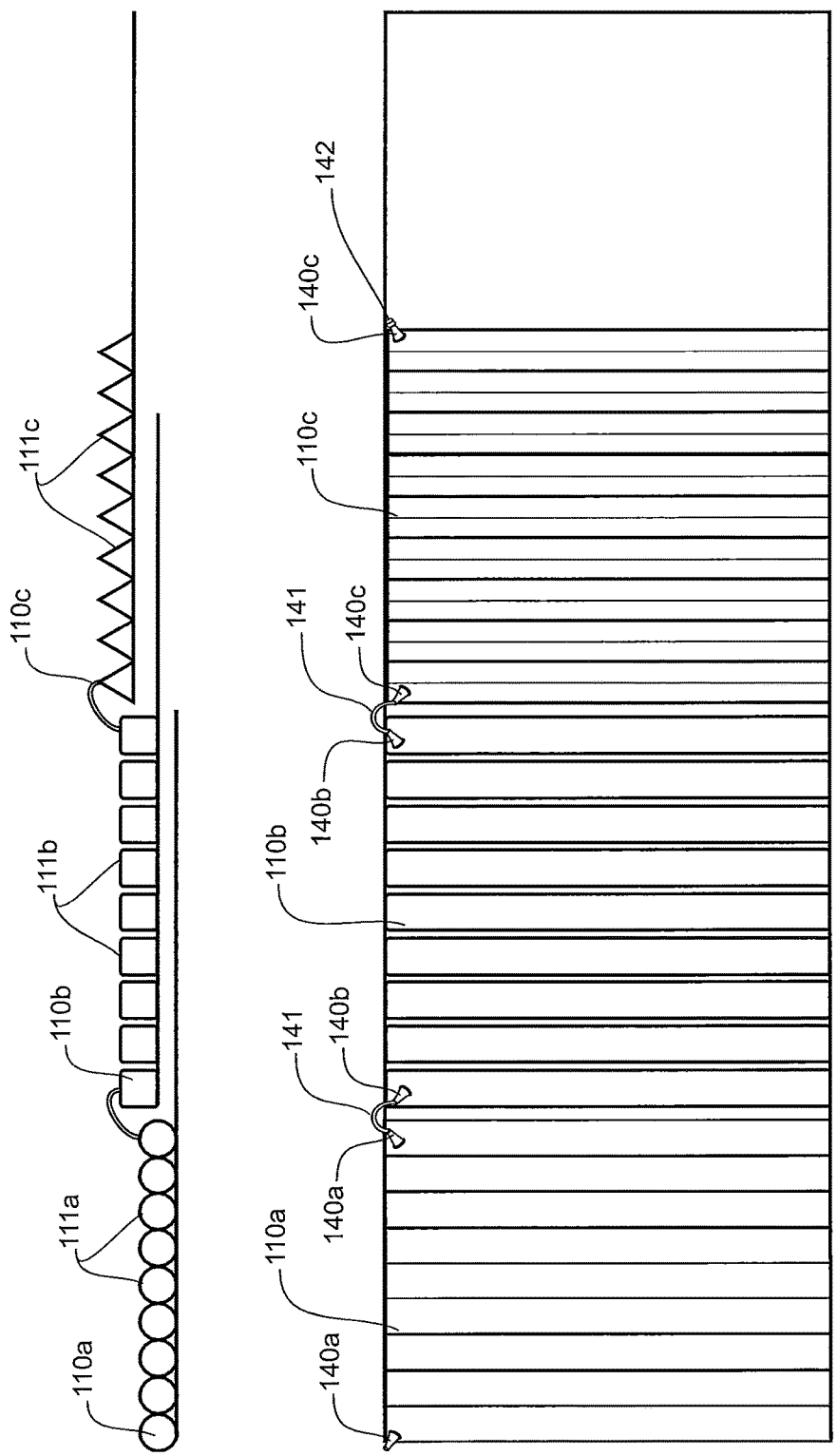

INFLATABLE CAVITY FILL OR CAVITY FORMING MEMBER

CROSS-REFERENCE TO RELATED APPLICATIONS

This application is the National Stage of International Application No. PCT/NZ2014/000058, filed Apr. 7, 2014, which the claims the benefit of and priority to New Zealand Application No. NZ 609098, filed Apr. 5, 2013. All of these applications are incorporated by reference herein in their entireties.

FIELD OF THE INVENTION

This invention relates to an inflatable device for filling a void space, creating a void space, or surrounding an object, and in particular though not solely, to an inflatable device for forming a sleeve for protecting a pipe passing/recessed through a void space in a medium.

BACKGROUND OF THE INVENTION

It is common place in the construction industry to require objects such as pipes, fittings, cables, conduits or concrete columns for example, to pass or recess through a medium such as concrete, gypsum plaster, wood, earth, stone or gravel. It is important to create a space between the object and the surrounding medium through which it passes to allow for relative movements and maintain the integrity of the components within the system. For example, spacing the object and the surrounding medium not only protects the object and/or medium from abrasion but also allows for thermal expansion, vibration and other movements.

Known methods for protecting an object as such include providing a thin sleeve, a polystyrene sleeve or a bubble wrap sleeve over the object. Each one of these methods has its own set of disadvantages, including:

Thin sleeve products do not provide a cavity between the object and the medium and therefore do not allow for movement in certain directions, Polystyrene products are prone to break, difficult to ship, not adjustable and are not adaptable. They also cannot be linked or coupled once the medium is set which leaves debris on the site.

Bubble wrap products cannot easily be adjusted on site and cannot form different cavity shapes.

It is also common place in the construction industry to require cavities to be created in a medium into which fittings or housings can be installed once the surrounding medium has set. For example, a wooden block is sometimes used to create a cavity for an electrical box in a wall. The block is removed after the plaster has set by chipping the wood. This process would usually require the application of a solvent to the wooden block. As such, the process becomes somewhat expensive, time consuming and messy.

It is an object of the present invention to provide an improved method and/or device for creating or filling a void space or protecting an object, or to at least go some way towards providing an alternative or to provide the public with a useful choice.

SUMMARY OF THE INVENTION

In a first aspect the invention may broadly be said to consist of a device for filling or creating a void comprising:

a body having at least one inflatable body portion, each inflatable body portion having one or more inflatable cavity, at least one valve member fluidly connected to the one or more inflatable cavity to control flow of fluid into and inflate said cavity, wherein the one or more cavity are shaped to substantially fill or create the void in an inflated state.

In a preferred embodiment the void is a cavity formed in/by a construction member.

Preferably the device is configured to fill or create the cavity at least during curing of a construction medium, such as concrete.

Preferably the at least one valve member is configured to enable deflation of the one or more inflatable cavity. This may advantageously enable removal of the device after the construction medium has cured.

Preferably, the shape of the device or at least the shape of one or more inflatable cavity of the device, when in an inflated (either partially or wholly) state, corresponds to the shape of the void to be filled or created. For example, in the inflated state the device or one or more inflatable cavity may be cylindrical, or a rectangular, triangular, L-shaped, T-shaped, or U-shaped prism, or any other geometric shape.

In one embodiment the device is a sleeve configured to couple about an object, such as a pipe, to fill or create a void between the object and a surrounding medium, for example at least during curing of the surrounding medium. Preferably the sleeve also protects the object after the surrounding medium has cured.

Preferably the sleeve in an operative state comprises an inner periphery corresponding to an outer periphery of the object and an outer periphery corresponding to a shape of the void space to be created and/or filled between the object (such as a conduit) and a surrounding medium.

In a second aspect the invention may broadly be said to consist of a method for creating a void in a curable medium (e.g. a construction medium), the method comprising the steps of:

locating an inflatable device in a region where the void is to be created, the device to an inflated shape corresponding to a shape of the void to be created, and allowing the construction medium to cure around said device.

Preferably, the step of locating may be performed before or after the step of inflating.

The method may further comprise adjusting the level of inflation/deflation in situ to control any one or more of a size, shape or volume of the void and/or to control a desired strength, rigidity, flexibility, location, shape, length, height, width, size or volume of the device.

In one embodiment the method further comprises, after curing of the construction medium, deflating the device and removing the device from the region to create the void in the medium.

In a third aspect the invention may broadly be said to consist of a protective sleeve comprising:

a body having at least one inflatable body portion, each inflatable body portion having one or more inflatable cavity, at least one valve member fluidly connected to the one or more inflatable cavity to control flow of fluid into and inflate said cavity.

Preferably the body comprises at least one cover portion substantially devoid of one or more inflatable cavity.

Preferably, in an operative state, said protective sleeve is coupled, for example to itself, about an object to protect said object, wherein said at least one inflatable body portion forms an inner layer adjacent the object and said at least one cover portion forms an outer layer substantially adjacent an exterior-facing surface or surface portions of the inner layer.

Preferably the inner layer is of a perimeter and length that may substantially envelop an outer periphery of said object. Preferably the outer layer is of a perimeter and length that substantially envelops the inner layer.

Preferably the body comprises at least one flap portion substantially devoid of one or more inflatable cavity, extending from the cover portion and configured to extend over an end of the inflatable body portion in the operative state. More preferably, a flap portion may extend over one or both ends of the inflatable body portion in the or an operative state.

Preferably the valve member is operable to inflate and deflate the one or more inflatable cavity in or out of situ. More preferably, there may be two or more valve members associated with two or more fluidly connected separate cavities or groups/sections of cavities.

Preferably, the valve member(s) may be operable to inflate or partially inflate the one or more inflatable cavity prior to installation of the sleeve and may then be further operable to adjustably and individually inflate in situ any combination of cavities or cavity groups/sections to achieve any one or more of a desired shape, strength, rigidity, flexibility, location, length, height, width, size or volume for example depending on the application.

Preferably the valve is configured to receive fluid from a fluid source to introduce into said one or more inflatable cavity. More preferably, the fluid source may provide a fluid that maintains its state after being introduced into the one or more cavity, such as air and water, or a fluid that is permanently curable after being introduced, such as foam or silicon. The fluid may be or comprise of a fire retardant substance or other substances to provide chemical or physical properties as desired. In this manner, the device acts as a fire retardant medium to provide fire resistant properties to the space between the object and the surrounding medium.

The fluid source may comprise a compressor, cartridge or ambient atmosphere, and a delivery device may be provided between the source and valve, such as a pump, for delivering the fluid to the valve. Optionally, the fluid source may be provided by a manual system (e.g. by a manually actuated pump or by a user (e.g. lungs) themselves).

Alternatively the protective sleeve may comprise a pre-stored foaming agent in the one or more inflatable body portion and an activation mechanism for activating release of the foaming agent into the one or more cavity to inflate said cavity.

In a preferred embodiment the object is a conduit.

Preferably, the portion of the conduit to be protected is a portion adjacent a surrounding medium through which the conduit at least partially extends in situ, and the body of the protective sleeve is configured to substantially create and/or fill a space between the portion of the conduit to be protected and the surrounding medium.

Preferably the at least one cover portion is substantially smooth to provide a substantially smooth outer layer adjacent the surrounding medium in use.

The conduit may be a pipe, a fitting or other connection and the surrounding medium may be concrete, earth, stone or gravel or any combination thereof.

In one embodiment the one or more inflatable body portion comprises a cavity having a plurality of longitudinally extending inflatable cavity sections across the inflatable body portion. Preferably each cavity section is fluidly coupled to adjacent cavity section(s) at corresponding ends of the sections. Preferably, in the operative state, the cavity sections are longitudinally aligned with a longitudinal axis of the conduit and circumferentially spaced about the periphery of the conduit.

Preferably the sections are all of a substantially similar size/volume. Alternatively the sections are of alternating larger and smaller sizes/volumes.

In one embodiment the one or more inflatable body portion comprises a plurality of inflatable cavity sections configured in fluidly distinct groups of one or more inflatable cavity sections. Preferably the device comprises a plurality of valves, each valve associated with a corresponding group of one or more inflatable cavity sections.

Preferably, in use, each group may be inflated to a desired level to effect a desired shape, volume, length, width or height and/or a desired level of flexibility, strength or for example at a corresponding location of the group of the installed device.

In one embodiment the one or more inflatable body portion comprises a plurality of longitudinally extending and substantially parallel cavities. Preferably the cavities are fluidly connected at an intersection between two adjacent cavities and along the lengths of the cavities.

In one embodiment the one or more inflatable body portion comprises a plurality of inflatable cavities or one cavity having a plurality of cavity sections, the cavity or cavity sections having varying shapes, sizes, orientations, distributions or any combination thereof.

In one embodiment, one or more of the inflatable cavity may comprise an internal web structure for providing shape and/or strength to the cavity.

Preferably the cover portion extends integrally from one side of the inflatable body portion. Alternatively the cover portion is separately formed and is configured to couple an edge of the inflatable body portion, or may be tucked into the gap between the internal surface of the sleeve and the object being wrapped or surrounded by the protective sleeve. Yet still further, the cover portion may be attachable to an object to be surrounded by the protective sleeve.

The body may be formed from any one or a combination of a polyethylene, PVC (polyvinylchloride), TPU (thermoplastic polyurethane), elastomeric or other polymer material, fabric, or any other material capable of holding or entrapping the filler material or substance, which may be a solid, liquid or gas such as sand, polystyrene beads, water, foam or air. The material preferably possesses UV resistant, moisture resistant and/or low air breathability properties. It will also be understood the material to be used can be appropriate to the application. In some instances, it may be preferred that the material is biodegradable (e.g. paper, hemp or cloth etc), and yet in other instances may be non-biodegradable.

The body may be formed from a single layer of material or multiple layers.

The body may comprise a reflective coating. The body may additionally or alternatively comprise a layer of heat insulating material. Alternatively, the body may be coated with a heat or cold resistant material.

The sleeve, or at least portions of the sleeve or body, may be colour coded depending on an intended application or use.

Preferably, the body having or comprising the at least one inflatable body portion further comprises one or more cut-outs. More preferably, the one or more cut-outs are interspersed between the one or more inflatable cavities.

Preferably, the at least one cover portion substantially devoid of one or more inflatable cavity or cavities further comprises one or more cut-outs. More preferably, the one or more cut-outs are arranged to correspond with one or more cut-outs in the at least one inflatable body portion of the sleeve.

Preferably, the sleeve comprises one or more cut-outs, said one or more cut-outs arranged to, in use, allow a construction medium to pass through the one or more cut-outs. Advantageously, the one or more cut-outs facilitate a construction medium to be located about the sleeve and to be interposed through the cut-outs.

Preferably the sleeve, or at least the at least one cover portion, is formed of a substantially puncture resistant material. More preferably, is a substantially puncture resistant polymer or has resistance to puncture. Even more preferably, the material may be a fibre-reinforced type material for improved puncture resistance or other characteristics.

Preferably the one or more inflatable cavities allow for a mould shape to be achieved when surrounded by a construction medium, or alternatively (or in addition), the one or more inflatable cavities allow for a construction medium to be located about the external surface of the sleeve, including through the cut-outs.

In a further embodiment, the one or more cut-outs are at least in part defined by a perimeter of one or more of the inflatable cavities. For example, the cut-out portion may be a slit or cut through the protective sleeve body, or may alternatively be an entire section of material of the protective sleeve which is removed, such that a construction medium may then pass through an available aperture so created. It will be appreciated the cut-outs may be frangible sections or regions of weakness, such that a user may customise or self-determine which cut-outs to remove from the protective sleeve to allow an aperture to be formed and in turn for the construction medium (such as a curable medium or may be a non-curable medium such as gravel or loose chip or soil).

In this manner, the construction medium may then be continuous from a position located externally of the protective sleeve (i.e. outside of the cover portion), be located through or intermediate of the cut-outs and also be located at a position located about or adjacent or in contact with the object surrounded by the sleeve, or an intermediate position thereof, for example with an inner-most surface of the protective sleeve surrounds the body being protected, yet the construction medium is able to extend from the surrounding environment, through the cut-outs and to the space or gap which may exist between the external surface of the inflated cavities.

Preferably the cut-outs may be pre-formed, alternatively regions of the protective sleeve may be indexed to indicate to a user where to cut the protective sleeve without disrupting an inflatable cavity section.

Where cut-outs are used, the construction medium may allow the formation of webs or connection portions of medium between a surrounding environment and an inner region generally formed by the enclosure formed by the protective sleeve.

Preferably the one or more inflatable cavities form an inflatable labyrinth. Preferably the one or more inflatable cavities form an inflatable grid or two or more substantially parallel (e.g. longitudinal) inflatable cavity sections.

In a fourth aspect the invention may broadly be said to consist of a method of protecting a conduit comprising the steps of:

coupling a protective sleeve about the object, the sleeve having:

at least one inflatable body portion, each inflatable body portion having one or more inflatable cavity, at least one valve member fluidly connected to the one or more inflatable cavity to control flow of fluid into and inflate said cavity, and introducing a fluid into the one or more inflatable cavity to inflate the associated inflatable body portion of the sleeve.

It will be appreciated any one or more of the above aspects can be provided in combination with any one or more of the above preferred or alternative embodiments or features.

The term "comprising" as used in this specification means "consisting at least in part of". When interpreting each statement in this specification that includes the term "comprising", features other than that or those prefaced by the term may also be present. Related terms such as "comprise" and "comprises" are to be interpreted in the same manner.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

The invention consists in the foregoing and also envisages constructions of which the following gives examples only.

BRIEF DESCRIPTION OF THE DRAWINGS

Preferred embodiments of the invention will be described by way of example only and with reference to the drawings, in which:

FIG. 13 is a plan view of a sixth form sleeve having multiple inflatable body portions.

DETAILED DESCRIPTION OF PREFERRED EMBODIMENTS

Overview of Invention

Figure 1:
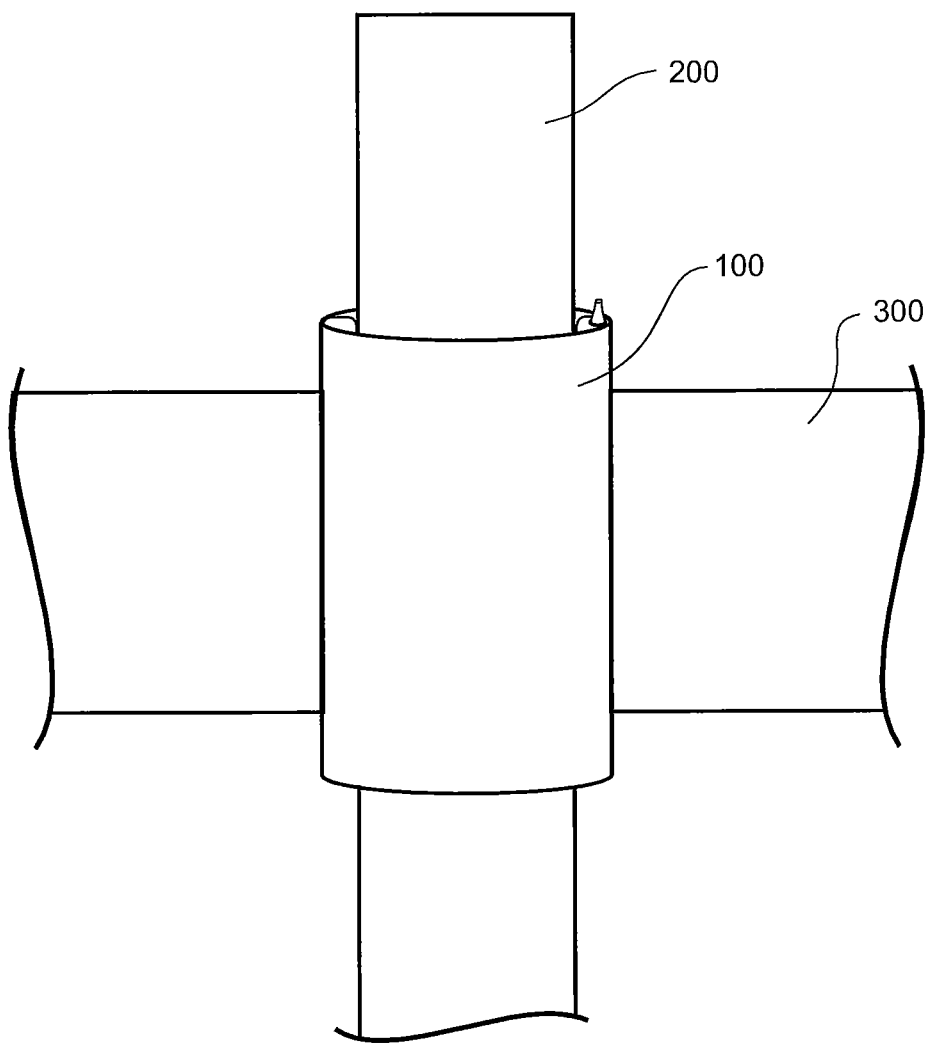
FIG. 1 is a perspective view of a first form protective sleeve in the operative state.

The invention relates to a device and method for filling and/or creating a void in a medium, preferably a construction medium such as concrete. The device is inflatable and/or the method requires inflation of the device in or out of situ to create or fill the required shape void and/or to protect an object. The device comprises a body having one or more inflatable cavity and a valve for inflation of the one or more cavity to the overall desired shape for the device, once installed. The inflated shape creates or fills a void in the construction medium. The device is retained in the desired inflated shape during curing and/or until the construction medium has cured. After the medium has finished curing, the device in the preferred form is deflated and removed from the resultant void created in the cured medium-but alternatively may be removed at a later stage or retained indefinitely and/or removed only for maintenance for example. In a preferred form, the device 100 can be deflated, removed and then reused to fill the same created void and/or to fill/create another void in another or the same medium.

In a preferred embodiment of the invention, the void is created to provide space between a surrounding medium and one or more objects extending into or through the surrounding medium. The device is preferably used in construction.

A primary purpose of the device can be to create a void space while the medium surrounding the object(s) is curing. The device may be deflated and removed after the medium has cured or it may be retained in an inflated state to fill the space between the object(s) and the cured medium and provide a secondary purpose of protecting the object(s) from abrasion or other damage caused through movement/contact against the medium.

Depending on the purpose of the device, the valve and inflation fluid provided to the device may enable inflation/deflation (adjustable inflation) of the device in situ and/or out of situ or may only enable inflation. For example, the valve may be a one way or two way valve and may be configured receive/remove air, water or a foam/foaming agent or any combination thereof.

In a preferred embodiment, inflation of the device is variable depending on any one or more of the required/desired volume, length, height, width, shape, flexibility, strength and/or rigidity of the device in the operative state.

After installation and curing of the surrounding medium, the device may be retained in position and may receive an object to protect the object from abrasion against or contact with the cured medium. Alternatively, the device may be deflated and removed leaving a cavity/void in place which may (or may not be) filled with another filler material, such as a fire retardant or insulation, which may be utilised to accommodate a fitting, such as an electrical box, or to receive an object such as a pipe for example. If a fire retardant is used the device acts to provide fire resistant properties to the space between an object and the surrounding medium for example. This method is simpler and cheaper than traditional methods which would otherwise require a separate cavity or container to be created for retaining the fire retardant material. As the body portion inflates to the required shape there is also less effort required to distribute the fire retardant or insulation material appropriately.

In another preferred embodiment, the device is a sleeve for coupling about one or multiple conduits to create a space between the conduits and a surrounding medium during curing. The sleeve is preferably retained in the inflated state to further protect the conduit(s) after the medium has cured. Alternatively, the sleeve may be deflated and removed once the medium has cured leaving a space between the conduit(s) and the medium to mitigate damage to the conduit(s).

The invention will be described in further detail below with reference to such a preferred embodiment. It will be appreciated however that the device may take on various other shapes or forms depending on the particular application. For instance the device may or may not be used to separate one or more objects from a surrounding medium.

In the or an inflated state, an inflatable portion of the device may take on a shape that corresponds to the shape of void to be created in the medium. For example one or more inflatable portions or cavity of the device may provide in combination or separately a shape that is cylindrical, or a rectangular, triangular, T-shaped, L-shaped, U-shaped prism, or any other geometric shape as required to fill or create the necessary void in the medium at least during curing of the medium. The shape formed by the device may or may not be deflatable after curing and in some embodiments is adjustably inflatable/deflatable to adjust the overall shape/size of shape during curing and/or to adjust a level of flexibility of the device after curing (if the device is retained in place).

Preferred Embodiment

Referring to FIG. 1, a preferred form sleeve 100 of the invention is shown operatively coupled about a conduit 200 to be protected. The sleeve comprises a body that is inflatable before and/or after being coupled to the conduit 200.

In the preferred embodiment the protective sleeve 100 is coupled to an area of the conduit 200 that extends (or that is intended to extend) through a surrounding medium (not shown). The surrounding medium 300 may be a concrete block, slab or structure, or any other solid material surrounding the conduit 200, such as earth, gravel, stone or any combination thereof.

The material is preferably curable from a liquid or semi-liquid (highly viscous) to a solid state. The conduit 200 is preferably a pipe (hereinafter conduit 200 will be referred to as pipe 200 in accordance with the preferred embodiment). The pipe 200 may be formed from concrete, metal or a plastics material. Alternatively the protective sleeve 100 may be used to protect a connection or fitting or any other object to which it is suited.

The inflatable body of the sleeve 100 provides a means for creating a void space between the pipe 200 and surrounding medium during curing of the medium and/or absorbing relative movements between the pipe 200 and the surrounding medium 300 to thereby prevent or substantially alleviate damage or abrasion caused by such movements of either one of these components (pipe or medium) after the medium has cured. The sleeve 100 may optionally be removed after the medium has cured (by first deflating the sleeve 100 to a sufficient level) or preferably can be retained in position to fill the space and act as a protective sleeve 100 for the pipe 200.

In the installed/operative state shown in FIG. 1, the protective sleeve 100 is coupled about the object (e.g. pipe) such that an inflatable body portion 110 (occluded by flap 130) forms an inner layer adjacent the pipe and the cover portion 120 forms an outer protective layer surrounding the inner layer. The cover layer 120 is intended to wrap around the inflatable body 110 to thereby envelop the body 110 and secure it about the pipe 200. The cover layer 120 is preferably provided with a fastening mechanism to secure a free end of the cover layer 120 after being wrapped around the inflatable body 110. The cover layer 120 is preferably integrally formed with an end of the inflatable body 110 and is wrapped about the inflatable body 110. Alternatively, the cover layer 120 may be separately formed and coupled about the inflatable body 110 in-situ. An adhesive may be provided along one or more edges of the cover and/or inner layers or a cable tie/string may otherwise be used to secure the cover layer after being wrapped around the inflatable body 110. A flap 130 extends from the outer cover layer 120 and operatively tucks under the inner inflatable body layer 110.

In still a further embodiment, the cover layer 120 may be provided to wrap about the inflatable body 110, and then an excess portion of the cover layer 120 can be tucked over the inflatable body 110 to hold the cover layer in position until a construction medium is provided about the sleeve. In yet another embodiment, the cover layer 120 may be provided to wrap about the inflatable body 110, and then an excess portion, such as the region 130, to be attached to the object being surrounded (e.g. the portion 130 may be glued or taped to the object.

Figure 2:
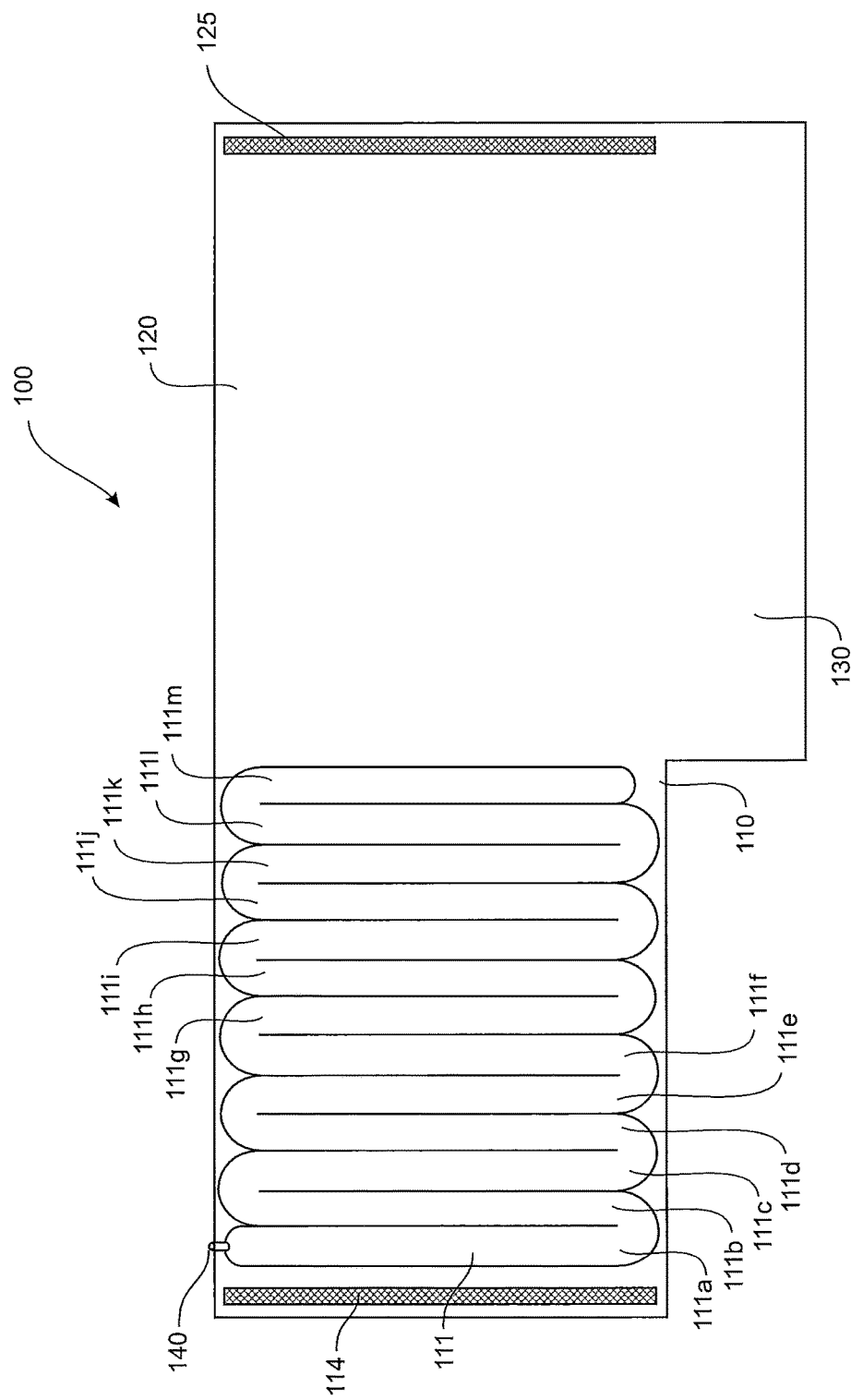
FIG. 2 is a plan view of the protective sleeve of FIG. 1 in the inoperative state.

Referring to FIG. 2, the protective sleeve 100 is preferably formed as a substantially planar sheet 105 of flexible material in the inoperative state and that can be inflated and wrapped around an object to protect the object in the operative state. The body 105 comprises an inflatable body portion 110, a cover portion 120, a flap portion 130 and a valve member 140.

Inflatable Body Portion

The inflatable body portion 110 comprises an inflatable cavity 111. A valve member 140 is provided to the cavity 111 to enable inflation of the cavities (using a fluid source—not shown). The inflatable body portion 110 may comprise one or more cavities 111, either discretely inflatable or fluidly connected with one another or in groups to enable inflation of multiple cavities 111 via one valve member 140. In the case of the embodiment shown, one cavity 111 is provided and connected to a single valve member 140. Alternative embodiments may comprise multiple cavities that are fluidly separated or fluidly connected in groups. A valve member 140 can be provided to each separate cavity/cavity group for inflation. The sleeve 100 is designed such that inflation of the body portion 110 can be achieved in situ once the sleeve 110 has been coupled about the object/pipe 200 to be protected and/or out of situ before coupling. In this manner, the inflatable body portion can be inflated to the particular level required/desired for that particular application, coupled and then adjustably inflated/deflated depending on the desired size, volume, location, shape, length, width, strength, flexibility or rigidity for the application for example.

It will be appreciated the sleeve may be provided as predetermined or particular shapes so as to be suited to specialist or custom shapes, for example where pipes intersect each other, the sleeve may be shaped so as to effectively surround the junction or intersection of such pipes (or other objects), yet still achieve a protection of those objects/pipes. In achieving this, once a construction medium surrounds the objects/pipes, the sleeve is able to work (once inflated) to provide protection as described herein.

The design or shape of the inflatable cavities may be provided so as to give features of flexibility or rigidity depending on preferred applications or needs or the fluid which may be used to inflate the cavities.

The inflatable body portion 110 of the sleeve 100 preferably comprises one or more inflatable cavities 111 that are sized, shaped, oriented and/or distributed in a manner that is suitable and/or customisable for a particular application. The object to protect may be a conduit/pipe having a circular, rectangular, triangular or any other any other cross-sectional shape/geometric shape or it may be an object having a different or more complex shape. The one or more inflatable cavity 111 enable the sleeve 100 to surround the object appropriately in the inflated state and also provide the desired shape to form/create the void space between the object and surrounding medium. In the preferred embodiment, the inflatable body portion 110 is formed such that in the inflated state, the inner periphery of the body portion 110 corresponds to an outer periphery of the object 200 to be protected, and an outer periphery of the inflated body portion 110 corresponds to the shape of the void space to be filled/created between the object 200 and surrounding medium 300.

Figure 3:
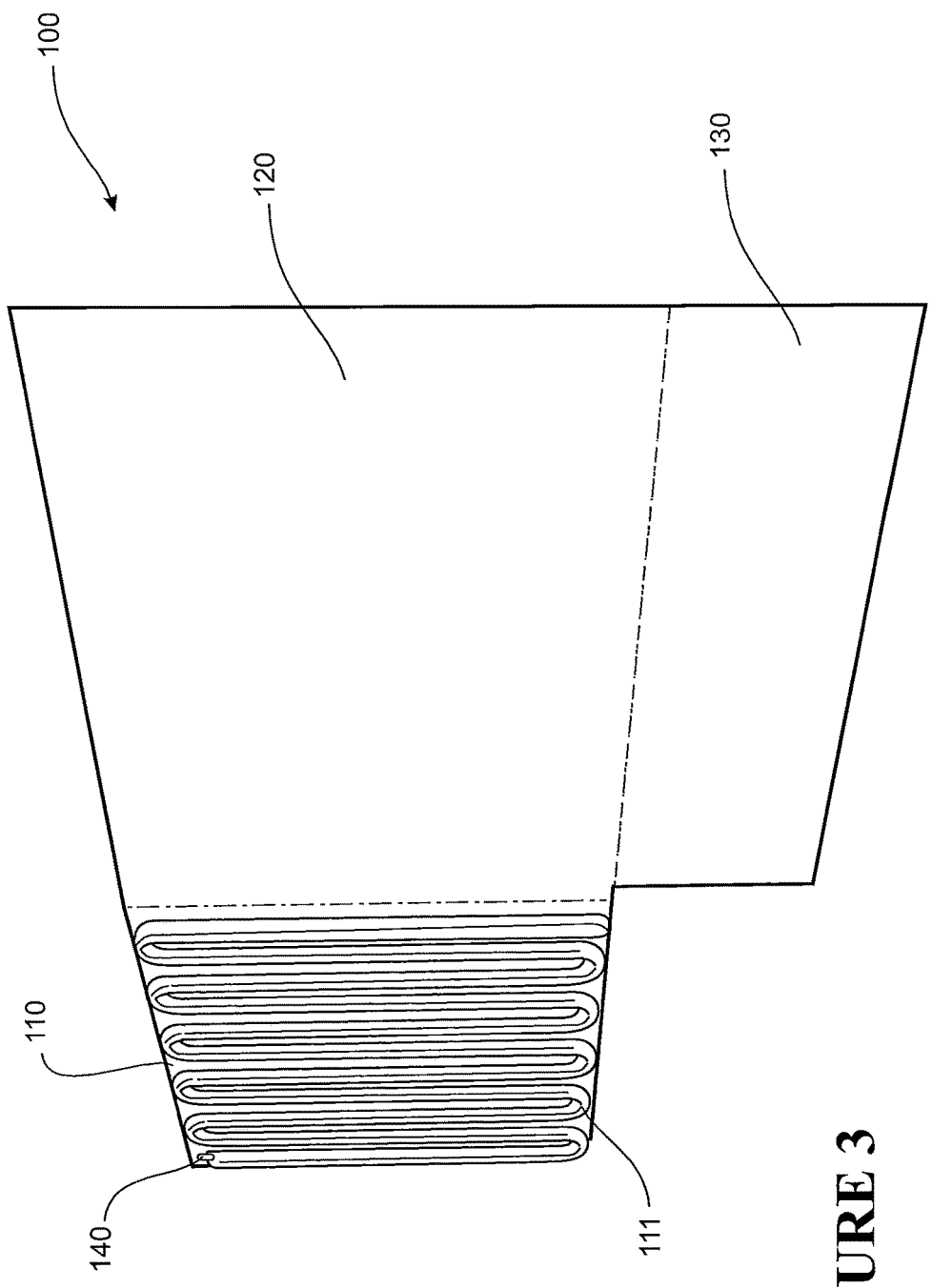
FIG. 3 is a perspective view of the protective sleeve of FIG. 1 in the inoperative state.

In the case of one preferred embodiment shown in FIGS. 1-3, the inflatable body portion 110 comprises one inflatable cavity 111 having multiple, fluidly connected and longitudinally extending cavity sections 111a-m. Each cavity section is of a similar shape, size and orientation as the other sections and adjacent cavity sections are fluidly connected at corresponding ends to form a repeating wave like cavity structure. In use, the inflatable body portion 110 is wrapped/coupled around the outer periphery of the pipe 200 such that the cavity sections 111a-m are aligned with the longitudinal axis of the pipe 200 and evenly spaced about the periphery of the pipe 200. The valve member 140 is provided to the cavity section 111a to enable inflation of the cavity 111a as well as the remainder of the sections 111a-m of the cavity 111 either before or after coupling the body to the pipe or both. The number, size and separation of the sections 111a-m is variable and depends on the particular size and shape of the object/pipe 200 to be protected.

FIGS. 4 to 8 show alternative embodiments of inflatable body portion 110.

Figure 4:
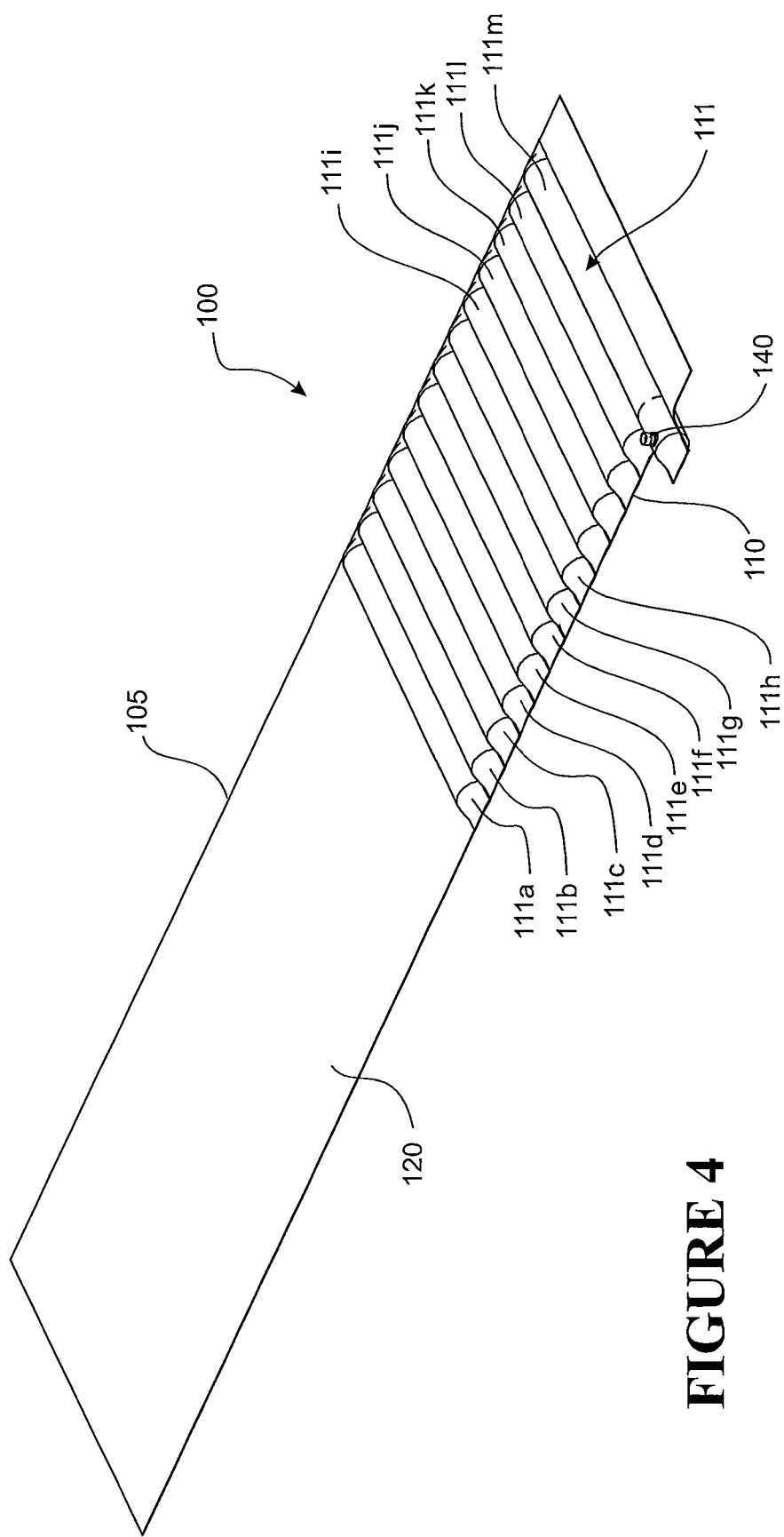
FIG. 4 is a perspective view of a second form protective sleeve in the inoperative state.
Figure 5A:
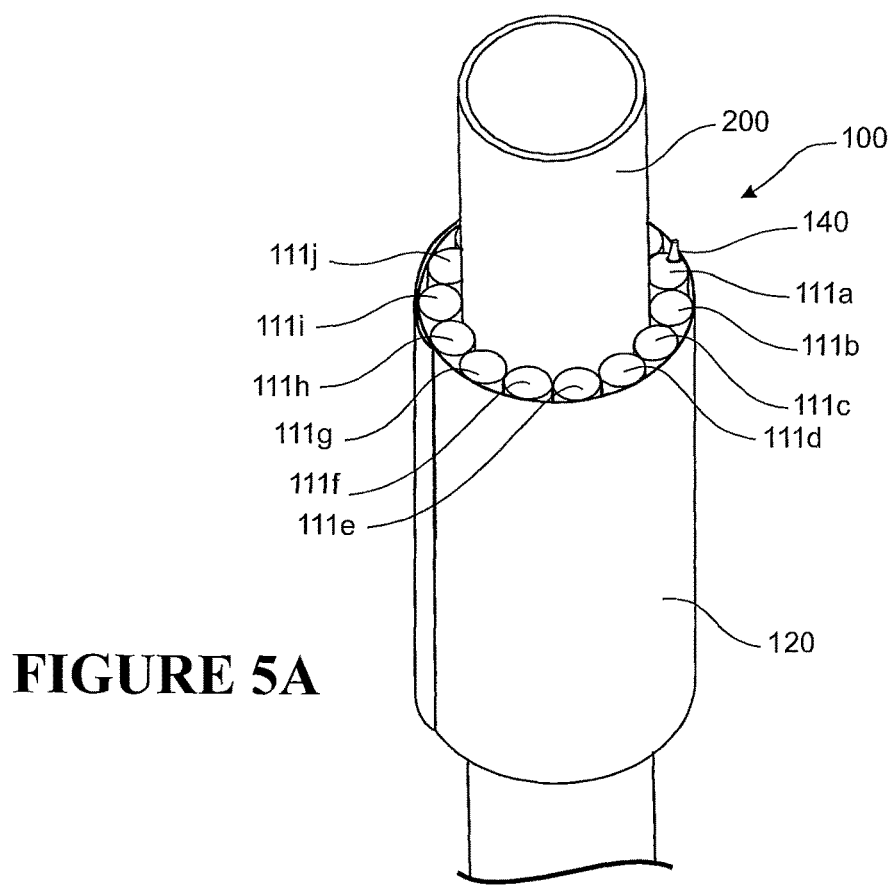
FIG. 5A is a perspective view of the second form protective sleeve of FIG. 4 in the operative state.

In the embodiment shown in FIGS. 4 and 5A, the inflatable body portion 110 may comprise a plurality of longitudinally extending cavities 111a-m arranged in parallel across the body portion 110. The cavities 111a-m are fluidly connected at the intersection between two adjacent cavities and along the lengths of the cavities. A single valve member 140 is provided to at least one of the cavities 111a to enable inflation of all the cavities. In an alternative embodiment, some of the cavities 111a-m may be fluidly sealed from other cavities to enable variable inflation between cavities/groups of cavities. A plurality of valve members 140 may need to be provided to inflate each of the sealed cavities/groups of cavities separately in such an embodiment.

Figure 5B:
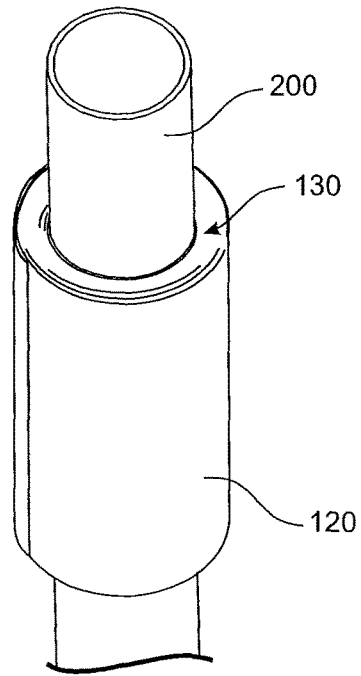
FIG. 5B illustrates how a cover portion may be tucked in upon the inflatable portion.
Figure 5C:
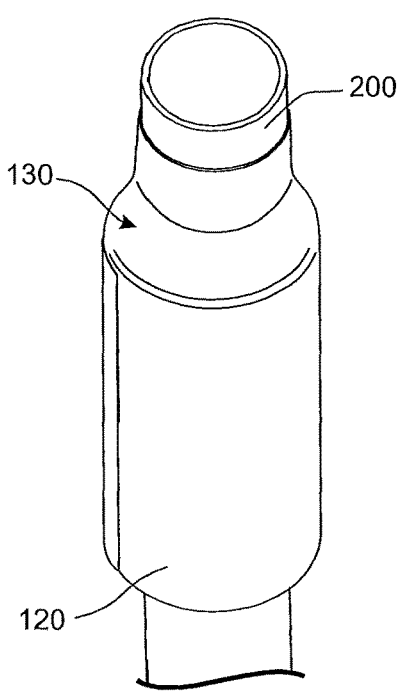
FIG. 5C illustrates how a cover portion may be attached to an object being surrounded by the protective sleeve.

FIGS. 5B and 5C illustrate alternative arrangements as to how the cover portion 120 may be tucked in upon the inflatable portion (see FIG. 5B), or the cover portion may be attached to the object 200 being surrounded.

Figure 6:
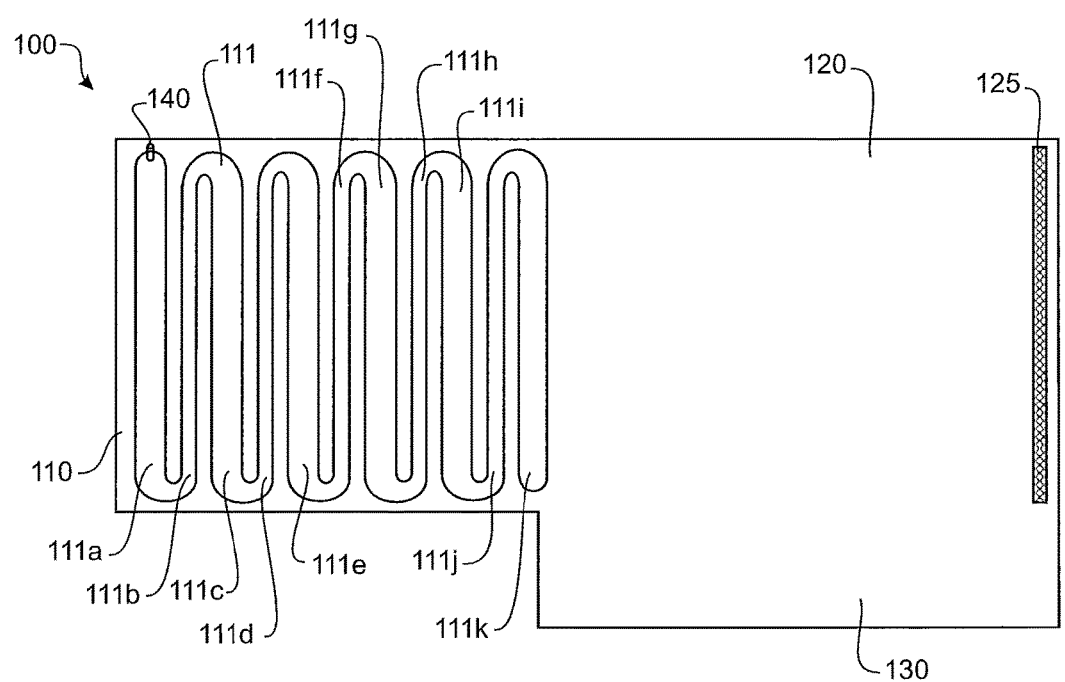
FIG. 6 is a plan view of a third form protective sleeve in the inoperative state.

FIG. 6 shows yet another alternative embodiment, similar to that of FIGS. 1-3, but having alternating relatively large (111a, c, e, g, i, k) and relatively small (111b, d, f, h, j) cavity sections. This structure may enable simpler/smoother wrapping of the inflatable body portion about a round pipe 200.

Figure 7A:
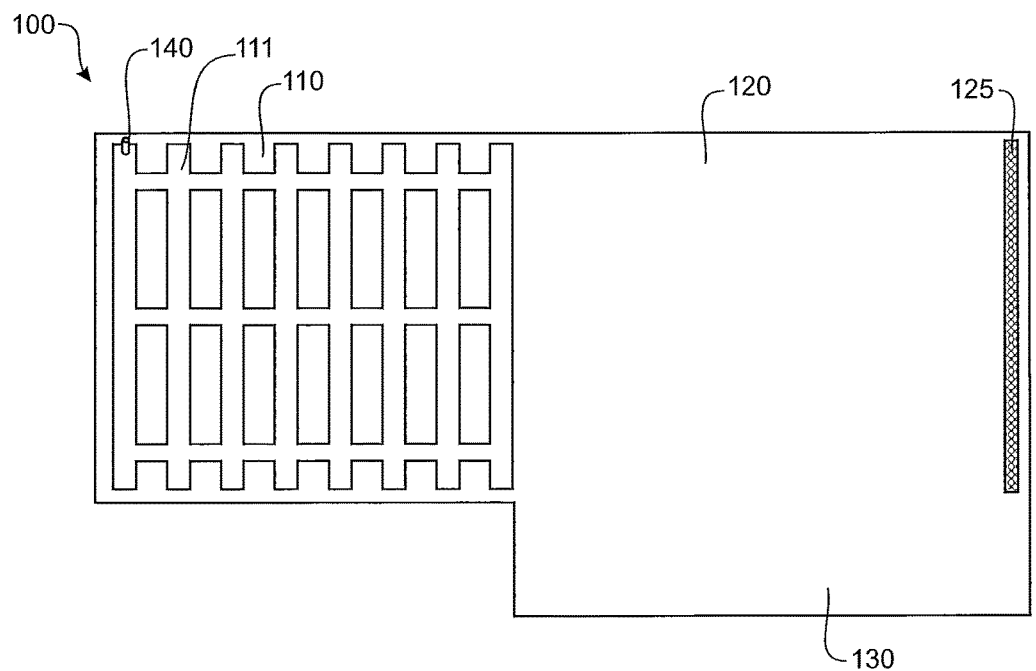
FIG. 7A is a schematic representing a protective sleeve embodiment having a more complex networked cavity.

FIG. 7A shows a schematic intended to represent a network of cavity sections to provide a more complex structure that may be suitable and/or customisable for enveloping other objects/applications. For instance, the cavities may be arranged in a grid as shown. Cavity sections may be fluidly connected or separated and may have any desired length, width, location, shape, strength, flexibility, rigidity and/or orientation as required for the intended application and/or to provide a means for locally customising any one of the above aspects of the inflatable body portion 110 for the intended application.

Figure 7B:
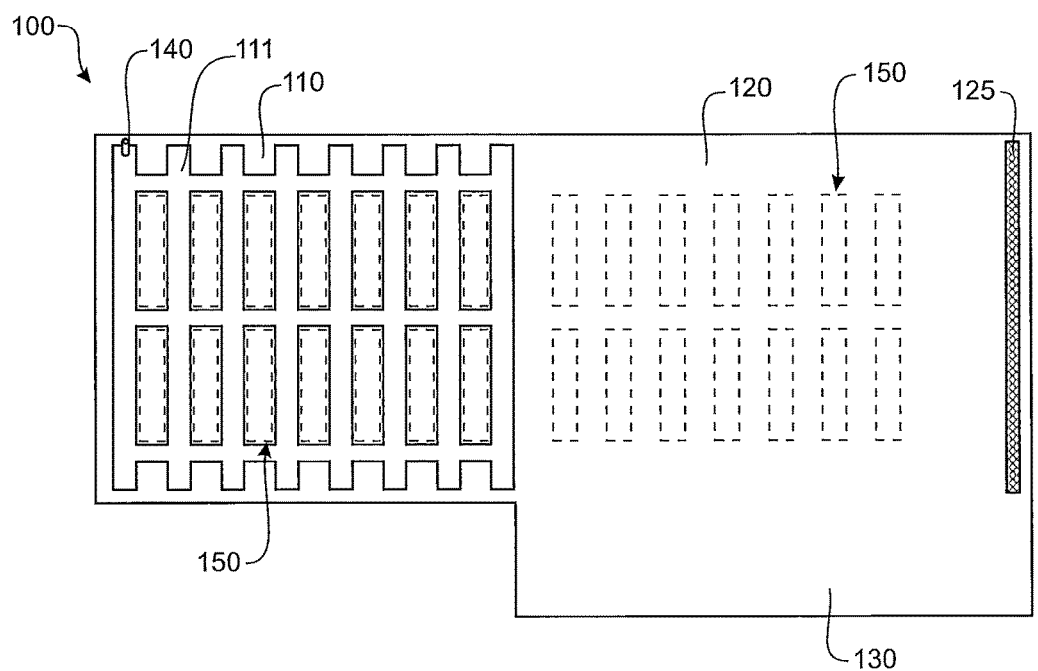
FIG. 7B illustrates an alternative arrangement which shows a series of cut-outs.

FIG. 7B illustrates an arrangement where cut-outs 150 are provided. Cut-outs may be sections of material removed from the sleeve itself, or may be partial cuts through the sleeve which allow for an aperture through the sleeve 100, or which may alternatively provide for a perimeter of weakness or frangibility which a user can then impose a force and remove cut-outs as they may wish.

The cavity sections may be arranged in a labyrinth to thereby leave a corresponding labyrinth cavity within the medium after it has cured around the device 100 and the device is deflated and removed.

It will be appreciated the cavity sections may be arranged in a manner, such as a grid or other series of shapes so as to provide for a desired shape to be achieved within a construction medium which surrounds the inflatable cavities/sections.

A series of separate cavity sections may be provided which may be inflated separately as needed, whether to a full inflation of the cavity or only partial inflation. Levels of inflation would for example depend on the desired size of the shape to be achieved.

Figure 8:
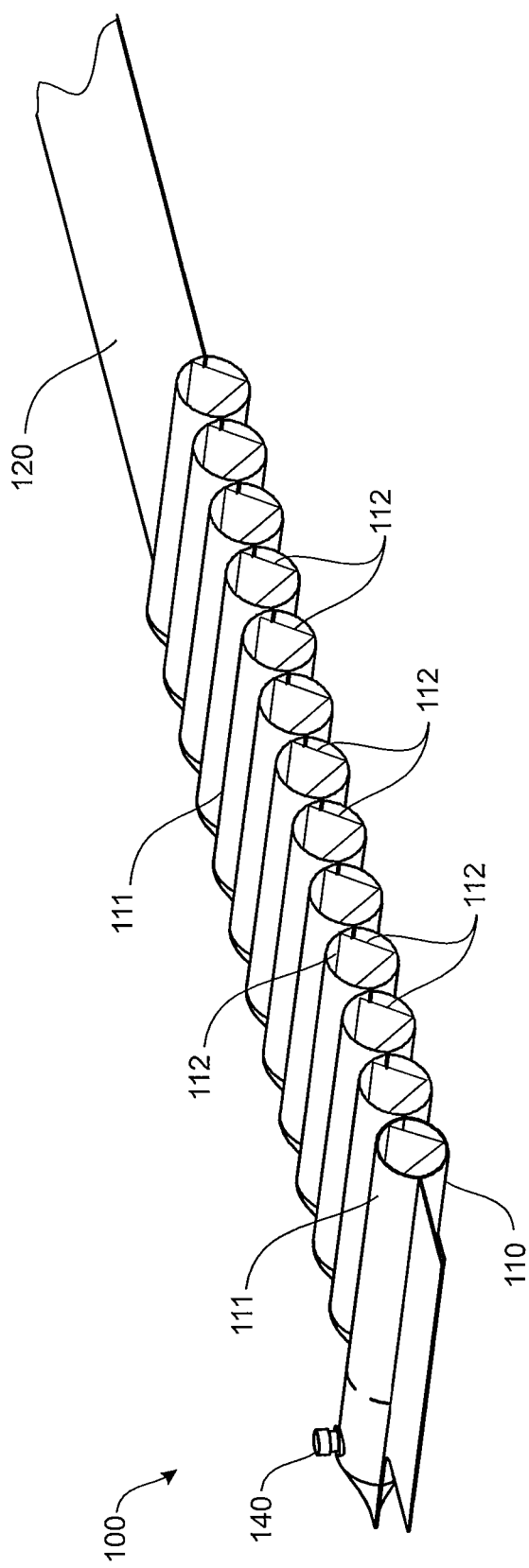
FIG. 8 is a perspective view of a protective sleeve of the invention comprising internal webbing.

Referring to FIG. 8, in one embodiment, the cavities/cavity sections 111 may comprise internal webbing 112 to provide structure to the cavity sections. The internal webs 112 can be provided to some or all of the cavity sections, along the entire length or just a portion of each cavity section and may promote a specified cross-sectional shape to each cavity section such as but not limited to circular, rectangular or triangular. Preferably the webbing 112 is formed from a substantially relatively harder material than the inflatable body 110 and preferably from flexible material such as polypropylene. Internal webbing can be provided to any one of the embodiments previously described with reference to FIGS. 1-7.

Figure 11:
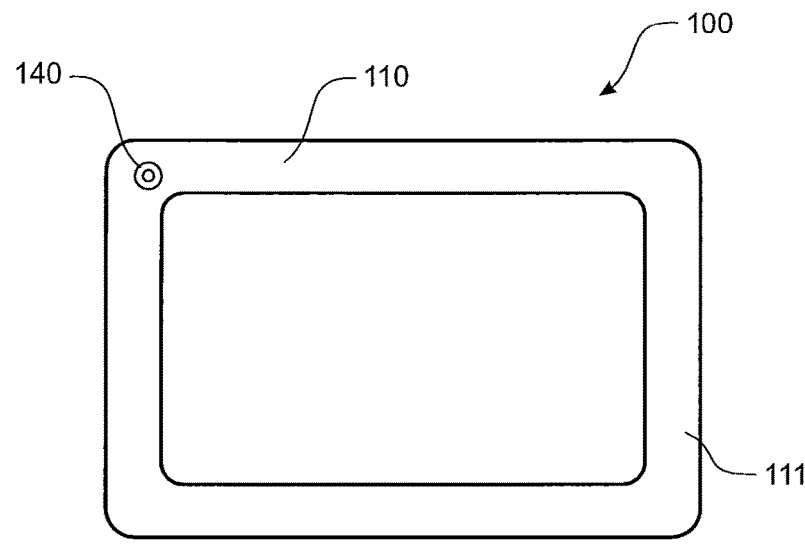
FIG. 11 is a plan view of a fourth form protective sleeve of the invention.

Referring to FIG. 11, in one embodiment, the inflatable body portion 110 comprises a rectangular cross-sectional shape to form and/or fill a rectangular void/cavity space in a curing surrounding medium. An object such as a pipe 200 may be passed through the interior of the inflated device 100 before or after the medium has cured. In this embodiment, the body portion 110 comprises one inflatable cavity 111 but it will be appreciated that alternatively the body portion may comprise multiple inflatable cavities to achieve the desired rectangular shape.

Figure 12:
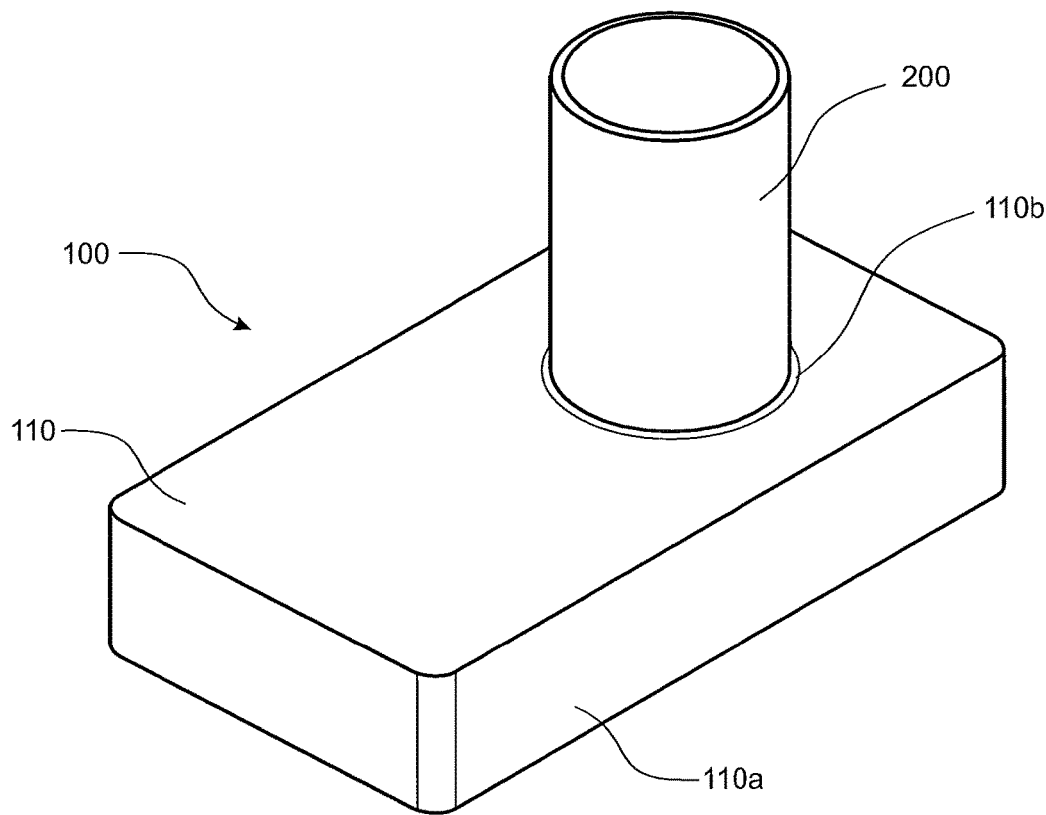
FIG. 12 is a perspective view of a fifth form sleeve in the operative state.

Referring to FIG. 12, in one embodiment, the inflatable body portion 110 comprises a rectangular cross-sectional shape at its outer periphery 110a and an annular inner periphery 110b. The inner periphery shape corresponds to the shape of an outer periphery of the pipe 200 to be protected. In this manner, the device 100 may take on any desired shape to create/fill a void and/or to protect an object. In embodiments where the device is to protect an object, the device may be in the form of a sleeve having, in the inflated/operative state, an inner peripheral shape corresponding to an outer peripheral shape of the object to be protected.

In an embodiment where the device may alternatively or also be used to create or fill a void space, an outer peripheral shape of the device, in the inflated/operative state, corresponds to the shape of the void space to be created/filled in the medium. The inner and outer peripheral shapes of the sleeve may be the same or different.

Referring to FIG. 13, in one embodiment, the sleeve 100 comprises multiple inflatable body portions 110A-C and/or multiple groups of one or more inflatable cavity 111. Each body portion/group 110A-C comprises a fluidly distinct set of cavities and at least one associated valve member 140A-C. The cavities of each group 110A-C may have a different shape, orientation, size and/or distribution to other groups, or they may be the same.

A level of inflation of each cavity group may be adjusted in accordance with the desired overall size/volume, flexibility, rigidity and/or strength of the device 100 in the inflated state. A pair of opposed valve members may be provided to each group to enable a connection tube 141 to be coupled between adjacent valve members of adjacent groups to fluidly connect the groups if required. A plug or stop 142 can be provided to any of the valve members.

A level of inflation of the one or more inflatable cavity may be adjustably inflated/deflated in situ to control the size/volume of the space between the conduit and medium and/or to control the flexibility, rigidity or strength of the sleeve 100 once retained within the space. For example, a higher level of inflation, when creating the space, would increase the size/volume of the space/void and a higher level of inflation after the medium has cured would make the sleeve 100 stiffer/stronger and/or able to resist higher forces from the conduit when moved. The sleeve is inflated to a desired/required level based on the application. For example, the amount of pressure applied to the outside of the sleeve determines the internal pressure required by the sleeve.

Cover Portion

The sleeve 100 further comprises a cover portion 120 substantially devoid of any inflatable cavities/cavity sections. The cover portion 120 extends from one side of the inflatable body portion 110 and is of a width that enables the cover portion to substantially envelop the inflatable body portion 110 after suitable inflation of the cavity 111. The cover portion 120 adds an additional layer of protection to the sleeve and to the inflatable body portion 110. The cover portion 120 also provides a substantially smooth and aesthetically appealing outer surface to the sleeve 110 in use. For example, the cover portion 120 may include reinforcing materials, such as fibre-reinforcements (e.g. fibre-glass or other materials) to improve resistance to failure, for example resistance to puncture.

A fastening mechanism 125 is provided to the sleeve 100 to secure the sleeve 100 about the pipe 200. In one embodiment, the fastening mechanism 125 is provided to the side of the cover 120 opposing the inflatable body portion 110 in the form of an adhesive strip 125. In use, the adhesive strip 125 would be pressed against a length of the cover 120 by a user after being wrapped around the inflatable body 110.

Alternative embodiments may utilise other forms of fastening, such as a hook and loop fastener arrangement, tape, string, cable tie or any other material that can be wrapped around or device/mechanism used to hold the inflatable body portion and/or cover portion in position for example.

In yet another alternative embodiment, a fastening mechanism is not provided and inflation of the body portion 110 causes cover portion 120 to contact against and be retained in a wrapped condition by an already cured or semi cured surrounding medium. It will be appreciated construction medium may also include non-curable materials, such as soil, gravel, stones, sand and other materials. Such materials may not necessarily be curable, but may be materials in which a void space is desired to be provided during construction, that void space being utilisable after construction (e.g. wires or conduit or other facilities or utilities may be passed through the inflatable cavities), In the preferred embodiment the cover portion 120 is integrally formed with one side of the inflatable body portion. In an alternative embodiment, the cover portion is separately formed and/or is separable from the inflatable body portion 110 and can be coupled to the body portion 110 in situ. An adhesive strip 114 may be provided on one or more edges of the inflatable body portion 110 to adhere the inflatable body portion 110 to the pipe 200 prior to wrapping the body portion 110 about the pipe 200. This could help in preventing spinning of the sleeve 100 about the pipe 200 during installation.

Flap Portion

Referring to FIGS. 1-3, 6, and 7A-B the sleeve 100 preferably further comprises a flap portion 130 extending from one or both ends 126/127 of the cover portion 120 for covering one or both ends of the inflatable body portion 110 once installed. As shown in FIG. 1, in the operative state, the flap 130 is tucked under the inflatable body portion 110 (or into the pipe 200) to cover the end of the body portion 110 and prevent unwanted matter from entering any voids formed between the sleeve 100 and the pipe 200. A corresponding flap may be provided on the opposing end to protect the other end of the body portion. The flap 130 comprises a fastening mechanism, such as an adhesive strip along an edge 131 of the flap 130 for securing the flap once tucked into the operative position by a user. Alternatively the flap 130 is tucked under without the use of a fastening mechanism. The flap 130 may be integrally or separately formed or separable from the cover portion 120. It will be appreciated the flap 130 is an excess portion of the cover portion 120 and may be attached (e.g. by tape or glue or other means) to the object to be surrounded, in this way, providing for a wrapping or sleeving of the inflatable cavities.

In an alternative embodiment shown in FIGS. 4 and 5A the sleeve 100 does not include a flap portion 130 for closing off an end of the sleeve 100.

Valve Member

The valve member 140 is provided to enable inflation/deflation of the cavity/cavity sections 111 and is preferably positioned for easy access by a user once the device is installed to allow for adjustment of the level of inflation in the operative state of the sleeve 100.

In a preferred embodiment, the valve member is located at a corner of the inflatable body portion 110. The valve member 140 may be a one way valve only allowing inflation or deflation or it may be a two-way valve allowing both inflation and deflation. In the preferred embodiment, the valve member 140 is a two way valve having a fluid connection to cavity 111 and a plug element associated with the valve to close off the valve 140 once the desired level of inflation/deflation is reached. Air may be provided to the valve from ambient or from a cartridge or compressor and may be delivered directly or through a pump, or may be delivered manually by a user through their mouth for example.

Alternative embodiments may utilise other fluids such as water, silicon or foam to inflate the cavity 111 through the valve member 140. In some embodiments, the fluid used to inflate the cavity 111 is permanently curable (for example foam or silicon) after injection into the cavity 111. In yet another embodiment, the fluid may comprise a fire retardant substance.

It is envisaged that in some alternative embodiments, a pre-stored foaming agent and an associated activation mechanism is provided to the sleeve 100. Inflation of the cavity 111 is achieved through activation of the mechanism which results in the release of the pre-stored foaming agent into the cavity 111.

Sizing

In a preferred embodiment, the inflatable body 110 and cover portions 120 are sized to extend along an approximately 100-1000 mm section of a pipe 200, an approximately 10-100 mm section, 150-800 mm section, an approximately 200-500 mm section or an approximately 250-350 mm section of the pipe 200. It will be appreciated different sized pipe or conduit may be surrounded by a protective sleeve of this invention.

In the most preferred embodiment the sleeve 100 is sized to extend along an approximately 300 mm section of the pipe 200. The sleeve may be sized to only protect a section adjacent the intersection between the pipe 200 and surrounding medium, or it may extend past the intersection to cover other lengths of the pipe acting as an insulator for the pipe 200. The sleeve 100 in the inflated state preferably create/fill at least a 25 mm space between the pipe 200 and surrounding medium 300.

The sleeve 100, and in particular the inflatable body portion 110 is preferably sized to wrap fully around a pipe having a diameter of approximately 10-500 mm. The cover portion 120 is of a greater width than the inflatable body portion 110 to enable the cover portion 120 to wrap fully around the inflatable body portion 110 at least once. The flap portion is preferably extends approximately 10-100 mm, more preferably approximately 20-70 mm, and most preferably approximately 50 mm from the cover portion 120 to provide enough length to tuck under at least the inflatable body portion 110 in use, or may attach to the object being surrounded by the sleeve 100, such as a pipe.

It will be appreciated that the size of the inflatable device 100 is dependent on the intended application. In one application the device may be used in roading applications for the purposes of installing underground utilities, cables, pipes or other conduits for example. An inflatable device of the invention may be located along the necessary length of road and inflated to form the desired cavity for subsequent cavity formation for laying of the cable, pipe or conduit therein, or the inflatable device may provide for a void space created by inflation of the device 100 through which subsequent utilities may be pulled or drawn along the necessary length of road or other subterranean pathway. In such an application, the diameter of the device may be in the order of meters (but could also be much less) and the length of the device may be in the order of meters or kilometers for example. The invention is therefore not intended to be limited to the above dimensions defined for the preferred embodiment and other dimensions are envisaged in accordance with other applications for which the device may be suited.

The sleeve 100 in some embodiments may be formed such that it only partially covers/protects the pipe or object 200 at the desired located which does not necessarily require the sleeve 100 to completely envelop the object. An associated coupling mechanism would be provided to the sleeve 100 in such an embodiment, such as adhesive strips allowing the inflatable body 110 or cover 120 to be directly adhered to the pipe/object 200.

Figure 9:
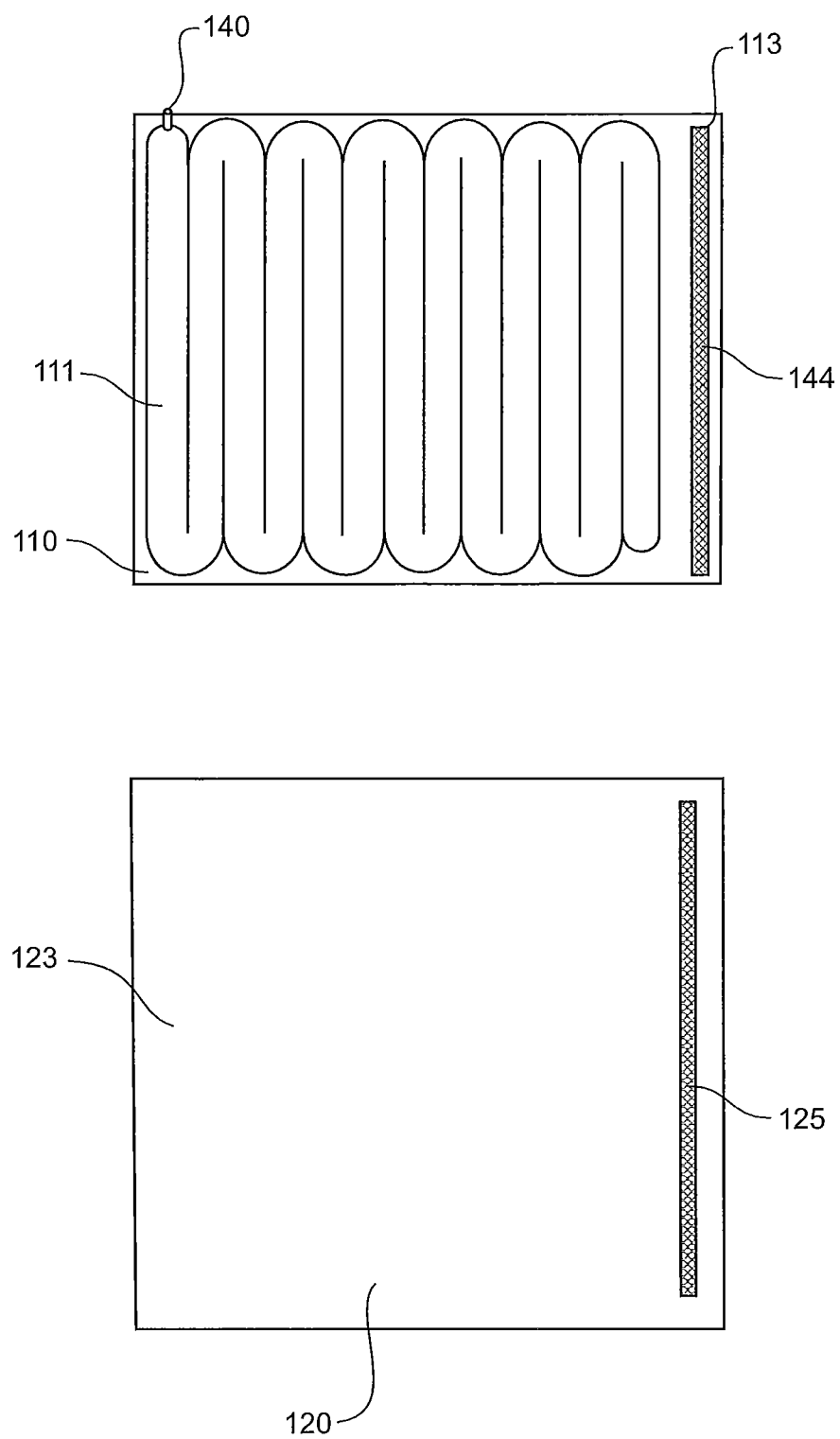
FIG. 9 is a plan view of a protective sleeve embodiment having separable inflatable body and cover portions.
Figure 10:
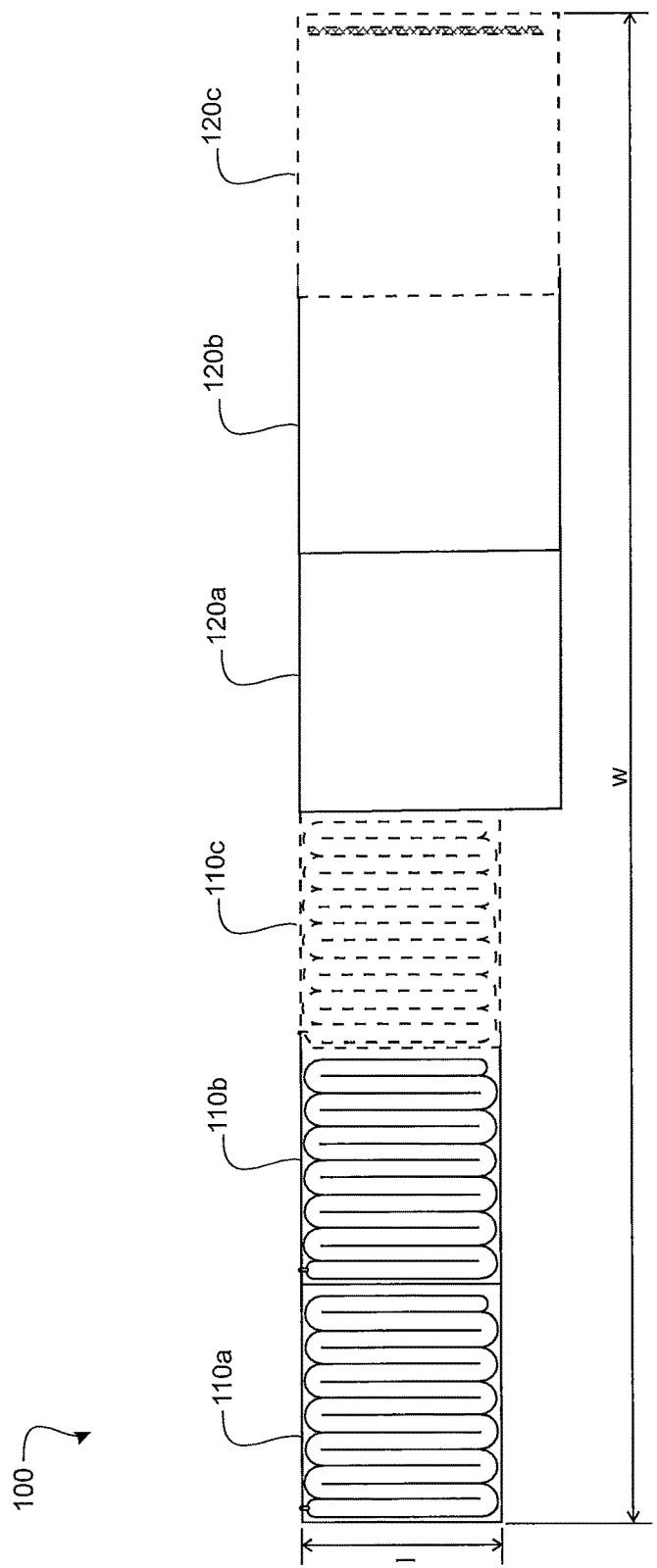
FIG. 10 is a plan view of multiple separable inflatable body and cover portions connected to form a protective sleeve in accordance with the embodiment of FIG. 9.

Referring to FIG. 9, in one embodiment, the cover portion 120 is separately formed and/or is separable from and can be coupled to the inflatable body portion 110 in situ. A coupling mechanism is provided on one or both corresponding sides 113/123 where the inflatable body portion 110 and the cover portion 120 are to be coupled. In the alternative embodiment shown, an adhesive strip 114 is provided at an edge 113 of the inflatable body portion 110 to couple the cover portion 120 thereon. Forming the inflatable body portion 110 and the cover portion 120 separately has the advantage of providing a modular system whereby a user can alter/customise the size of the sleeve 100 in accordance with the intended application. For example, as shown in FIG. 10 the effective width, w, of the sleeve 100 can be increased by coupling two or more inflatable body portions 110 and two or more covers 120 in the horizontal direction to form the sleeve as shown. Similarly, the effective length, l, of the sleeve 100 may be increased by coupling two or more inflatable body portions 110 and two or more covers 120 in the vertical direction.

In one embodiment, the inflatable body portions 110 are configured to fluidly connect with one another to enable inflation via a single inflation valve. It is envisaged that this could be achieved through the use of male and female connectors fluidly connected to cavities on opposing sides of the body portion 110. Stops or plugs could be provided for the connectors that will not be coupled to adjacent body portions 110, and such connectors may also serve the function of the inflation valve of the assembled sleeve 100.

2.6 Materials

The sleeve 100 and/or each components) 110/120/130 of the sleeve may be formed from polyethylene, PVC, TPU, elastomeric or any other polymer material or laminations of polymers including reinforcing material, or paper, fabric or any other material suited for the intended application and depending on the filler material/substance to be used to inflate the sleeve. The sleeve 100 can be formed using multi-layered polymers to thereby form the required cavity or cavities 111 within the inflatable body portion 110. The sleeve may include one or more reinforcing materials, such as fibreglass layers for example, to provide torsional strength in one direction for precast concrete applications for example. Alternatively, the sleeve 100 may be formed from a fabric such as a cloth material. The sleeve 100 may be provided with a heat insulating or reflective coating, or layered with a chemical or heat or cold resistant material. The sleeve may be formed from a substantially abrasion proof, weldable, sealable, joinable, gluable (e.g. using adhesive or glues), and/or sewable (e.g. can be mechanically linked together) material. The sleeve may be formed from a material possessing UV resistant, moisture resistant, stretch resistant, tear resistant, and/or low air breathability properties depending on the intended application and/or type of filler material/substance used to inflate the sleeve.

In one embodiment, the sleeve 100 or a portion of the sleeve 100 (such as the cover 120) is colour coded based on the intended application. For example gas pipes and hot water pipes may require protective sleeves of different sizes, shapes and/or material and the associated sleeve 100 may be manufactured in the appropriate colour to indicate suitability for such an application.

Operation

To install the sleeve 100, the user may first inflate the inflatable body 120 to a desired level, size, or shape (or may leave the body 120 deflated) then wrap the inflatable body 110 over the portion of the object/pipe 200 to be protected and continue to wrap the cover 120 over the inflatable body 110 to secure the body portion in place.

The cover 120 is secured in the operative position by engaging the fastening mechanism of the cover (if provided—e.g. by pressing the adhesive strip 125 against the appropriate surface of the cover 120 or alternatively via a cable tie or other fastener).

The flap 130 (if provided) is then tucked under an end of the inflatable body and secured in its operative position by the respective fastening mechanism provided or may be attached directly to the object being surrounded by the sleeve, for example directly to a pipe. The one or more cavity/cavity sections 111 of the inflatable body 110 (if not already inflated) are inflated in situ at any suitable stage during assembly.

The cavity/cavity sections 111 may also be adjustably inflated once installed by introducing fluid into the cavity (or cavities) 111 through the valve member 140 either prior to wrapping of the body 110 about the pipe 200 but preferably after wrapping and securing the cover 120 over the body 110.

The sleeve 100 may be adjustably inflated/deflated in situ to adjust the size/volume of the void space to be created between the medium 300 and pipe 200 and/or to adjust the level of strength/rigidity/flexibility/protection provided by the sleeve 100. After installing the sleeve 100 about the pipe 200 a surrounding medium 300 is then poured about the sleeve 100 and left to cure.

After the medium has finished curing, the sleeve 100 may be left to fill the void space between the cured medium 300 and the pipe 200 or may be deflated and removed leaving an empty void space between the medium 300 and the pipe 200. In the latter case, the empty void space may subsequently be filled with another filler material such as a fire retardant.

To uninstall or remove the sleeve 100 from the void space, the valve member 140 is operated to release fluid from the cavity 111 to thereby deflate the body 110. The sleeve 100 can then be detached from the pipe 200 by releasing the fastening mechanisms associated with the cover 120 and flap 130 and unwrapping the sleeve 100.

In alternative embodiments, the device 100 may be used to create and fill a void space that may be filled with a filler material, such as a fire retardant or other object/fitting such as an electrical box. In such an embodiment, to install the device 100, it is first inflated to the desired level and then a surrounding medium is poured and left to cure about the inflated device 100. After the medium has finished curing, the device 100 is deflated and removed resulting in a void space/cavity within the cured medium corresponding in shape to that of the inflated device 100. The remaining cavity may then be filled with the filler material or object/fitting.

In one preferred embodiment, the inflatable cavities may be filled or inflated by a fire retardant material, such a material being left in-situ once the construction medium is surrounded of the sleeve. The fire retardant then remaining in place. The sleeve effectively provided for flexible boxing material which contains a material of predetermined characteristics, such as fire retardancy, which may then be left in place during construction. This may be particularly advantageous compared with traditional methods of boxing which must typically be removed after the construction medium is put in place.

Further embodiments provide for the sleeve to be utilised as an inflatable shape which when surrounded by a construction medium, provides for a hollow core. Such a hollow core allows for shapes to be formed within a curable medium or other construction mediums which may assume a shape (such as by compaction of soil, stones, gravel). The sleeve allows for a shape to be made which, when inflated, can be cast over by the construction medium.

Applications

The inflatable device 100 of the invention is described in detail with reference to a preferred embodiment in which the device is provided in the form of a sleeve 100 for the intended use of creating a cavity for receiving a pipe in a curable surrounding medium and/or protecting the pipe/medium from abrasion.

The device 100 of the invention may therefore be used to create or fill a void in a curable medium, which may then be used to introduce an object or other substance, and/or to provide protection to an object surrounded by a medium. The device may therefore be retained in place or removed after the associated void has been created or filled for the appropriate period. The device, if removed, may be reused in another instance of that application. The inflatable body, including the one or more inflatable cavity of the body can take on any specific shape, distribution, orientation and size as required for the intended application. The level of inflation of each of the one or more inflatable cavity is also dependent on the application as described above.

The inflatable device 100 of the invention may alternatively be used in a number of other applications for creating a void or cavity, filling a void or cavity, and/or protecting an object, including, but not limited to:

Creating a cavity in a wall for receiving an electrical box or other fitting,
Creating a cavity within a road for laying pipes, conduits or cables,
Creating a cavity or a labyrinth cavity within a building structure for ducting for example,
Creating a cavity in a curable medium for installing a glass panel thereafter,
Creating channelling for cables within a building structure, or
Protecting a fitting, such as a door handle from abrasion or paint for example during construction.

The foregoing description of the invention includes preferred forms thereof. Modifications may be made thereto without departing from the scope of the invention.

The invention claimed is:

1. A device for filling or creating a void within a construction medium, the device comprising:
    a body, the body comprising at least one inflatable body portion, the at least one inflatable body portion comprising of one or more inflatable cavity;
    at least one cover portion is substantially devoid of the one or more inflatable cavity, and wherein the at least one cover portion extends integrally from one side edge of the inflatable body portion; and
    at least one valve member fluidly connected to the one or more inflatable cavity to control flow of fluid into and inflate the one or more inflatable cavity;
    wherein, in-use, the one or more inflatable cavity is/are shaped to substantially fill or create the void in a construction medium when in an inflated state and the at least one cover portion is able to wrap about at least a portion of the inflatable body portion; and
    wherein a flap portion extends from one or both ends of the inflatable body portion.

2. The device as claimed in claim 1, wherein the shape of the device or at least the shape of the one or more inflatable cavity of the device, when in the inflated state, defines the void.

3. The device as claimed in claim 1, wherein in an operative state, the device is coupled about an object to protect the object, wherein the at least one inflatable body portion forms an inner layer adjacent the object and the at least one cover portion forms an outer layer substantially adjacent an exterior-facing surface or surface portions of the inner layer.

4. The device as claimed in claim 3, wherein the inner layer is of a perimeter and length which substantially envelops an outer periphery of the object, and the outer layer is of a perimeter and length that substantially envelops the inner layer.

5. The device as claimed in claim 1, wherein the body comprises at least one flap portion substantially devoid of the one or more inflatable cavity, extending from the cover portion and configured to extend, in-use, over an end of the inflatable body portion in the operative state.

6. The device as claimed in claim 1, wherein two or more valve members are associated with two or more fluidly connected separate inflatable cavities.

7. The device as claimed in claim 1, wherein the valve is configured to receive fluid from a fluid source to introduce into the one or more inflatable cavity.

8. The device as claimed in claim 7, wherein the fluid is a fire retardant substance.

9. The device as claimed in claim 1, wherein the one or more inflatable cavities comprise a pre-stored foaming agent, and an activation mechanism for activating the foaming agent to inflate the one or more inflatable cavity.

10. The device as claimed in claim 1, wherein the at least one cover portion is substantially smooth to provide a substantially smooth outer layer adjacent the surrounding or construction medium in use.

11. The device as claimed in claim 1, wherein the one or more inflatable cavity comprises a plurality of longitudinally extending inflatable cavity sections across the inflatable body portion.

12. The device as claimed in claim 11, wherein each cavity section is fluidly coupled to adjacent cavity section(s) at corresponding ends of the sections.

13. The device as claimed in claim 11, wherein in an operative state, the device is coupled about a conduit, wherein the cavity sections are longitudinally aligned with a longitudinal axis of the conduit and circumferentially spaced about the periphery of the conduit.

14. The device as claimed in claim 11, wherein the sections are all of a substantially similar size or volume.

15. The device as claimed in claim 11, wherein the sections are of alternating larger and smaller sizes or volumes.

16. The device as claimed in claim 1, wherein the at least one inflatable body portion comprises a plurality of inflatable cavity sections configured in fluidly distinct groups of one or more inflatable cavity sections.

17. The device as claimed in claim 1, wherein the at least one inflatable body portion comprises a plurality of longitudinally extending and substantially parallel cavities.

18. The device as claimed in claim 1, wherein one or more of the one or more inflatable cavity comprises an internal web structure.

19. The device as claimed in claim 1, wherein the at least one cover portion extends integrally from opposing sides of the inflatable body portion.

20. The device as claimed in claim 1, wherein the at least one inflatable body portion, or the at least one cover portion, or both, comprises one or more cut-outs.

21. The device as claimed in claim 20, wherein the one or more cut-outs are interspersed between the one or more inflatable cavities.

22. The device as claimed in claim 21, wherein cut-outs of the at least one cover portion are arranged to correspond with one or more cut-outs in the at least one inflatable body portion.

23. The device as claimed in claim 20, wherein the cut-outs are a slit or slot or section of material removed or are a region defined by a frangible perimeter, such that, in-use, the cut-outs facilitate a construction medium to pass therethrough.

24. A device for filling or creating a void within a construction medium, the device comprising:
- a body, the body comprising at least one inflatable body portion, the at least one inflatable body portion comprising of one or more inflatable cavity;
- at least one cover portion is substantially devoid of the one or more inflatable cavity, and wherein the at least one cover portion extends integrally from one side edge of the inflatable body portion; and
- at least one valve member fluidly connected to the one or more inflatable cavity to control flow of fluid into and inflate the one or more inflatable cavity;
- wherein, in-use, the one or more inflatable cavity is/are shaped to substantially fill or create the void in a construction medium when in an inflated state and the at least one cover portion is able to wrap about at least a portion of the inflatable body portion; and
- wherein in an operative state, the device is coupled about an object to protect the object, wherein the at least one inflatable body portion forms an inner layer adjacent the object and the at least one cover portion forms an outer layer substantially adjacent an exterior-facing surface or surface portions of the inner layer.

25. A device for filling or creating a void within a construction medium, the device comprising:
- a body, the body comprising at least one inflatable body portion, the at least one inflatable body portion comprising of one or more inflatable cavity;
- at least one cover portion is substantially devoid of the one or more inflatable cavity, and wherein the at least one cover portion extends integrally from one side edge of the inflatable body portion; and
- at least one valve member fluidly connected to the one or more inflatable cavity to control flow of fluid into and inflate the one or more inflatable cavity;
- wherein, in-use, the one or more inflatable cavity is/are shaped to substantially fill or create the void in a construction medium when in an inflated state and the at least one cover portion is able to wrap about at least a portion of the inflatable body portion;
- wherein the one or more inflatable cavity comprises a plurality of longitudinally extending inflatable cavity sections across the inflatable body portion; and
- wherein in an operative state, the device is coupled about a conduit, wherein the cavity sections are longitudinally aligned with a longitudinal axis of the conduit and circumferentially spaced about the periphery of the conduit.

* * * * *